United States Patent
Shaheen

(10) Patent No.: US 8,582,529 B2
(45) Date of Patent: Nov. 12, 2013

(54) RESOURCE MANAGEMENT FOR MOBILITY BETWEEN DIFFERENT WIRELESS COMMUNICATIONS ARCHITECTURES

(75) Inventor: Kamel M. Shaheen, King of Prussia, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 1236 days.

(21) Appl. No.: 12/143,518

(22) Filed: Jun. 20, 2008

(65) Prior Publication Data

US 2008/0316972 A1 Dec. 25, 2008

Related U.S. Application Data

(60) Provisional application No. 60/945,610, filed on Jun. 22, 2007, provisional application No. 60/946,162, filed on Jun. 26, 2007.

(51) Int. Cl.
*H04W 4/00* (2009.01)
*H04W 36/00* (2009.01)
*G06F 17/00* (2006.01)

(52) U.S. Cl.
USPC ............................... 370/331; 455/436; 726/1

(58) Field of Classification Search
USPC ........... 455/432.1, 432.3, 436–439, 440–444; 370/328, 331, 338, 395.21
See application file for complete search history.

(56) References Cited

U.S. PATENT DOCUMENTS

| | | |
|---|---|---|
| 2006/0056448 A1 | 3/2006 | Zaki et al. |
| 2007/0243872 A1* | 10/2007 | Gallagher et al. ............ 455/436 |
| 2007/0281699 A1* | 12/2007 | Rasanen ....................... 455/436 |
| 2008/0229385 A1* | 9/2008 | Feder et al. ....................... 726/1 |
| 2009/0135783 A1* | 5/2009 | Khalil et al. .................. 370/331 |

OTHER PUBLICATIONS

"IEEE 802.21 Media Independent Handover: Media Independent Handover: Functions and Services Specification" Jan. 9, 2005. https://www.ieee802.org/21/.*

"3GPP TS 23.402 v0.5.0 (May 2007) Architecture Enhancements for non-3GPP accesses. Release 8." Copyright 2006.*

Nokia, "Inter access system handover between 3GPP and non 3GPP access systems," 3GPP TSG SA WG2 Architecture—S2#SAE AdHoc, S2H060490 (Apr. 3-6, 2006).

Nortel, "QoS Concept—Call Flows for Split PCRF," 3GPP TSG SA WG2 Architecture—S2#SAEAdHoc, S2H060371 (Apr. 3-6, 2006).

(Continued)

*Primary Examiner* — Ian N Moore
*Assistant Examiner* — Kiet Tang
(74) *Attorney, Agent, or Firm* — Condo Roccia LLP

(57) ABSTRACT

A method of and apparatus for handover between a 3GPP based network and a non-3GPP network is disclosed where a policy update to a new gateway is requested. A confirmation of the policy update is sent from the policy and charging rules function (PCRF) to the 3GPP packet data network gateway (PDN GW). The new gateway also confirms the policy update to the currently serving gateway. The tunnel endpoints and radio resources are released between the PDN GW and the evolved Packet Data Gateway (ePDG), thereby freeing the resources previously used by the wireless transmit/receive unit (WTRU). A release acknowledgement is sent from the serving gateway to the PCRF confirming the policy update process is complete. The method may be used for handover between 3GPP and non-3GPP networks and vice versa. The method and apparatus may be practiced over the S2*b* or S2*c* interfaces.

16 Claims, 15 Drawing Sheets

(56) References Cited

OTHER PUBLICATIONS

Third Generation Partnership Project, "Technical Specification Group Services and System Aspects; 3GPP System Architecture Evolution: Architecture Enhancements for non-3GPP accesses; Release 8", 3GPP TS 23.402, V1.1.0, (Jun. 2007).

Third Generation Partnership Project, "Technical Specification Group Services and System Aspects; 3GPP System Architecture Evolution: Architecture Enhancements for non-3GPP accesses; Release 8"3GPP TS 23.402, V8.2.0, (Jun. 2008).

Third Generation Partnership Project, "Technical Specification Group Services and System Aspects; General Packet Radio Service (GPRS) enhancements for Evolved Universal Terrestrial Radio Access Network (E-UTRAN) Access (Release 8)", 3GPP TS 23.401, V1.0.0, (Jun. 2007).

Third Generation Partnership Project, "Technical Specification Group Services and System Aspects; General Packet Radio Service (GPRS) enchancements for Evolved Universal Terrestrial Radio Access Network (E-UTRAN) Access (Release 8)", 3GPP TS 23.401, V8.2.0, (Jun. 2008).

Third Generation Partnership Project, "Technical Specification Group Services and System Aspects; 3GPP System Architecture Evolution: Architecture Enhancements for non-3GPP accesses; Release 8", 3GPP TS 23.402, V1.0.0, (May 2007).

3rd Generation Partnership Project (3GPP), S2H060412, "Signalling flow on SAE Qos negotiation", 3GPP TSG SA WG2 Architecture—S2#SAEAdHoc, Apr. 3, 2006, 7 pages.

\* cited by examiner

RESOURCE MANAGEMENT FOR MOBILITY BETWEEN DIFFERENT WIRELESS COMMUNICATIONS ARCHITECTURES

CROSS REFERENCE TO RELATED APPLICATIONS

This application claims the benefit of U.S. Provisional Application No. 60/945,610 filed on Jun. 22, 2007 and U.S. Provisional Application No. 60/946,162 filed on Jun. 26, 2007, which are incorporated by reference as if fully set forth.

FIELD OF INVENTION

The application relates to wireless communications. More particularly, the application relates to resource management when moving between different wireless communication architectures.

BACKGROUND

In mobile communication systems, the nature of mobile devices creates situations where as a wireless transmit/receive unit (WTRU) moves through an area, the WTRU may encounter multiple gateways through which it could connect. These multiple gateways may use different communication architectures to connect devices and to Internet protocol (IP) access.

Some gateways may be under the control of a service to which the WTRU user subscribes. Other gateways may belong to systems that are not aware of the user but may still allow the user's WTRU to establish a connection.

As the user moves throughout the coverage areas of these gateways, it may be better for the WTRU to switch from a current communication architecture to another architecture, such as a trusted network, or a network that may be able to take advantage of more sophisticated capabilities of the WTRU. When this occurs, a handover takes place to move the access from the original network architecture to the newly detected architecture. Likewise, when a trusted network architecture's signal becomes weak, the WTRU may decide to handover to a different network architecture.

In prior handoff methodologies, the WTRU could establish connectivity with the new network architecture and abruptly sever its connection with the original network. It would be beneficial if the original network connection could be terminated in an orderly fashion when handover between network architectures occurs.

The network architecture showing the relationship between a third generation partnership project (3GPP) architecture and a non-3GPP architecture is depicted in FIG. 1. A network architecture 100 includes a 3GPP and non-3GPP system architecture, divided by a dashed line 101. Above the line 101 is 3GPP compliant architecture and below the dashed line 101 connections is a non-3GPP architecture. WTRU 103 may gain access to the 3GPP architecture through connection S2a 105, S2b 107, or S2c 109, depending on the architecture to which the WTRU 103 is connected and the relation of that architecture to the 3GPP network. If the non-3GPP architecture is a trusted non-3GPP IP connection 111, the connection to the packet data network gateway 113 is made directly through S2a 105. S2a 105 provides the user plane with related control and mobility support between trusted non 3GPP IP access and the packet data network (PDN) Gateway (GW) 113.

When the non-3GPP architecture is untrusted 115, the connection is made through an evolved Packet Data Gateway (ePDG) 117. The connection between the ePDG 117 and the PDN GW 113 is made through an S2b 109 connection. S2b 109 provides the user plane with related control and mobility support between evolved packet data gateway (ePDG 117) and the PDN GW 113.

Connection between the WTRU 103 and the PDN GW 113, while the WTRU 103 is connected to either a trusted or untrusted non-3GPP or 3GPP, may be provided through S2c 107. S2c 107 provides the user plane with related control and mobility support between a wireless transmit/receive unit (WTRU) 103 and the PDN GW 113. This reference point is implemented over trusted and/or untrusted non-3GPP access and/or 3GPP access.

An S5 connection 119 exists between the PDN GW 113 and a serving gateway 121 in the 3GPP system. S5 119 provides user plane tunneling and tunnel management between Serving GW and PDN GW. It is used for Serving GW relocation due to mobility and in case the Serving GW needs to connect to a non-collocated PDN GW for the required PDN connectivity.

An S6a interface 123 is defined between mobility management entity (MME) 125 and home subscriber server (HSS) 127 for authentication and authorization.

The point defined by S6c 129 is the reference point between PDN GW 113 in a home public land mobile network (HPLMN) and a 3GPP authentication, authorization and accounting (AAA) server 131 for mobility related authentication if needed. This reference point may also be used to retrieve and request storage of mobility parameters.

Reference point S6d (not shown) is between Serving Gateway in a visited public land mobile network (VPLMN) and a 3GPP AAA Proxy for mobility related authentication if needed. This reference point may also be used to retrieve and request storage of mobility parameters.

Connection S7 133 provides transfer of quality of service (QoS) policy and charging rules from policy and charging rules function (PCRF) 135 to policy and charging enforcement point (PCEF) (not shown).

SGi 117 is the reference point between the PDN Gateway 113 and the packet data network 139. The packet data network 139 may be an operator external public or private packet data network or an intra operator packet data network, e.g. for provision of IP multimedia subsystem (IMS) services. This reference point supports any 3GPP and non-3GPP access systems.

Wa* 141 connects the untrusted non-3GPP IP access with the 3GPP AAA server/proxy 131 and transports access authentication, authorization and charging-related information in a secure manner.

Ta* 143 connects the trusted non-3GPP IP Access 111 with the 3GPP AAA server/proxy 131 and transports access authentication, authorization, mobility parameters and charging-related information in a secure manner.

The Wm* 145 reference point is located between 3GPP AAA Server/Proxy 131 and ePDG 117 and is used for AAA signaling, (transport of mobility parameters, tunnel authentication and authorization data).

Wn* 147 is the reference point between the untrusted Non-3GPP IP Access 115 and the ePDG 117. Traffic on this interface for a initiated tunnel has to be forced towards ePDG 117.

Wx* 149 is the reference point is located between 3GPP AAA Server 131 and HSS 127 and is used for transport of authentication data.

A diagram illustrating the handover process between untrusted non-3GPP IP access using PMIPv6 to an E-UTRAN 3GPP network is depicted in FIG. 2. The WTRU 201 is initially connected to the untrusted non-3GPP access. There is an IPsec tunnel 203 between the WTRU 201 and the ePDG 205 and a PMIPv6 tunnel 207 between the ePDG and the PDN GW 209. As the WTRU 201 moves, it may switch from the untrusted non-3GPP IP access to a 3GPP architecture such as E-UTRAN. The WTRU 201 attaches to the E-UTRAN network 211. Next, the WTRU 201 performs access authorization with the mobility management entity (MME) 213. The MME 213 contacts the home subscriber server (HSS) 215 for authentication of the WTRU 201. As part of the authentication procedure, the packet data network gateway (PDN GW) 209 that will be used is conveyed to the MME 213. The MME 213 performs a location update procedure and subscriber data retrieval 214 from the HSS 215. After the MME 213 authenticates the WTRU 201, it sends a create default bearer request message 217 to the serving gateway (GW) 219. In the message 217, the MME 213 includes the WTRU's 201 identifier (NAI) and the PDN GW 209 that will be used. The serving GW 219 sends a proxy binding update (BU) message 221 to the PDN GW 209 to setup a default bearer for the WTRU 201. The proxy BU 221 includes the WTRU's 201 identifier and a request for an IP address from the PDN GW 209. The PDN GW 209 processes the proxy BU message 221 from the serving GW 219, updates the binding cache entry for the WTRU 201 and responds with a proxy binding acknowledgement 223. In the proxy binding acknowledgement (Ack) 223, the PDN GW 209 replies with the same IP address or prefix that was assigned to the WTRU 201 earlier. At that point a PMIPv6 tunnel 225 exists between the PDN GW 209 and the serving GW 219. The serving GW 219 responds to the MME 213 with the create default bearer response message 217. In this message 217, the serving GW 219 includes the IP address of the WTRU 201. An S1_U default bearer establishment procedure 227 is performed. This procedure includes a radio bearer setup 228. At the end of the handover procedure 200, there is a default bearer for the WTRU 201 that consists of E-UTRAN radio bearer 227, S1 bearer between the e Node B and the serving GW 219 and a PMIPv6 tunnel 229 between the serving GW 219 and the PDN GW 209.

FIGS. 3A and 3B are an illustration of a handover procedure over interface S2c of FIG. 1 from non-3GPP IP Access to 3GPP access. The session starts in untrusted non-3GPP access 301 using DSMIPv6 over the S2c interface. The session hands over to 3GPP access, for example, E-UTRAN 303. The WTRU 305 uses an untrusted non-3GPP access system 301. It has an IPsec/IKEv2 session with the ePDG 307 and a DSMIPv6 session with the PDN GW 309. The WTRU 305 discovers the 3GPP access system 303 and decides to handover from the currently used trusted non-3GPP 301 access system to the discovered 3GPP access system 302. The WTRU 305 sends an attach request 313 which is routed by 3GPP access system 303 to an MME 311 instance in the evolved packet core (EPC) which is not shown. The MME 311 contacts the HSS/3GPP authorization and authentication (AAA) 315 and authenticates the WTRU 305. As part of the authentication procedure, the IP address of the PDN GW 309 that will be used for 3GPP access is conveyed to the MME 311. After successful authentication, the MME 311 performs a location update procedure with HSS 315. The MME 311 selects a serving GW 317 and sends a create default bearer request message 319 to the selected PDN GW 309. The serving GW 317 may initiate the PMIPv6 registration procedure towards the PDN GW 309 by sending a Proxy Binding Update 321, such as when using Internet Engineering Task Force (IETF) based S5 interface between the PDN GW 309 and the serving GW 317. If GPRS Tunneling Protocol (GTP) is used for S5, the serving GW 307 send a create bearer request message 309 to the PDN GW 309. In IETF based S5, the PDN GW 309 responds with a proxy binding acknowledgement 327 and updates its mobility binding which effectively switches the DSMIPv6 tunnel from the non-3GPP access network to the PMIPv6 tunnel to the serving GW 307. In the proxy binding acknowledgement 327, the PDN GW 309 includes the home IP address or prefix that was assigned to the WTRU 305 earlier. For GTP-based S5, the PDN GW 309 responds with a create bearer response message 329 to the serving GW 307. The create bearer response 329 contains the home IP address or prefix that was assigned to the WTRU 305 earlier. The serving GW 317 then returns a create default bearer response message 329 to the MME 311 that includes the IP address of the WTRU 305. This message 329 also serves as an indication to the MME 311 that the binding was successful. The MME 311 sends an attach accept message 331 to the WTRU 305 through 3GPP access 303. The 3GPP access system 303 initiates radio bearer setup procedures and the 3GPP access system responds with an Attach Complete Message 331. The WTRU 305 may send a binding update 321 to the PDN GW 309 to de-register its DSMIPv6 binding 325 that was created with the WTRU 305 was in untrusted non-3GPP IP access 301. The WTRU 305 may send IKEv2 messages if necessary to tear down its system aspects (SA) with the ePDG 307.

A handover process 400 from 3GPP IP Access to untrusted non-3GPP IP access over the S2b interface is shown in FIG. 4. The WTRU 401 is connected to the 3GPP network through the serving GW 403 through a PMIPv6 Tunnel 405 to the PDN GW 407 when handover is initiated and the WTRU attaches to the non-3GPP network 411. Authentication of the WTRU 401 is done by the HSS/AAA 409 on the 3GPP system. IKEv2 authorization and tunnel setup 415 between the WTRU 401 and the ePDG 413. A proxy binding update message 417 is sent the PDN GW 407. The proxy binding Acknowledgement message 419 is returned to the ePDG 413. The IPsec tunnel setup and address configuration is performed 421 and the PMIPv6 tunnel 423 is established between the ePDG 413 and the PDN GW 407. Non-3GPP IP access is now established through an IPsec Tunnel 425 between the WTRU 401 and the ePDG 413 and a PMIPv6 tunnel 427 between the ePDG 413 and the PDN GW 407.

The handover process 500 from 3GPP IP Access to trusted/untrusted non-3GPP IP access over the S2c interface is shown in FIG. 5. The WTRU 501 is connected to the 3GPP network through the serving GW 503 through a PMIPv6 Tunnel 505 to the PDN GW 507 when handover is initiated and the WTRU attaches to the non-3GPP network 511. Authentication of the WTRU 501 is done by the HSS/AAA 509 on the 3GPP system. IKEv2 authorization and tunnel setup 515 between the WTRU 501 and the ePDG 513 when the non-3GPP network is untrusted. Alternatively, the IKEv2 authorization and tunnel setup 516 may occur between the WTRU 501 and the PDN GW 507 when the non-3GPP network is a trusted network. A proxy binding update message 517 is sent the PDN GW 507. The proxy binding Acknowledgement message 517 is returned to the ePDG 513. The IPsec tunnel setup and address configuration is performed 521 and the PMIPv6 tunnel 527 is established between the WTRU 501 and the PDN GW 507. Non-3GPP IP access is now established through an IPsec Tunnel 525 between the WTRU 501 and the ePDG 513 and a PMIPv6 tunnel 527 between the WTRU 501 and the PDN GW 507.

SUMMARY

A method for and apparatus for handover between a 3GPP based network and a non-3GPP network is disclosed where a policy update to a new gateway is requested. A confirmation of the policy update is sent from the policy and charging rules function (PCRF) to the 3GPP packet data network gateway (PDN GW). The new gateway also confirms the policy update to the 3GPP serving gateway. The tunnel endpoints and radio resources are released between the PDN GW and the evolved Packet Data Gateway (ePDG), thereby freeing the resources previously used by the wireless transmit/receive unit (WTRU). A release acknowledgement is sent from the serving gateway to the PCRF confirming the policy update process is complete. The method may be used for handover between 3GPP and non-3GPP networks and vice versa. The method and apparatus may be practiced over the S2b or S2c interfaces.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 10:
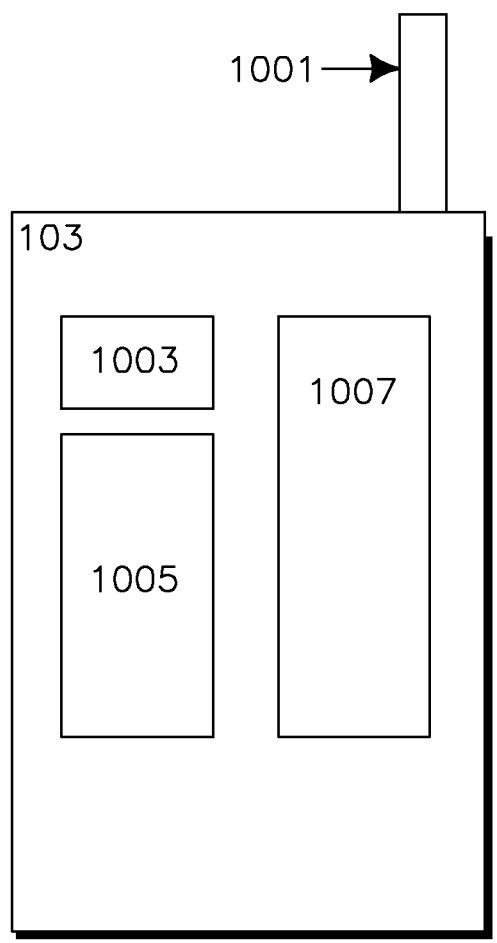
FIG. 10 is a block diagram of a wireless transmit/receive unit (WTRU).

A simplified diagram of a WTRU is shown in FIG. 10. The WTRU 103 is comprised of an antenna 1001 for sending and receiving wireless signals. A processor 1003 controls the other components of the WTRU. A memory 1005 stores data, for example instructions that may be executed by the processor 1003. A transceiver 1007 sends and transmits data through the antenna 1001.

Figure 1:
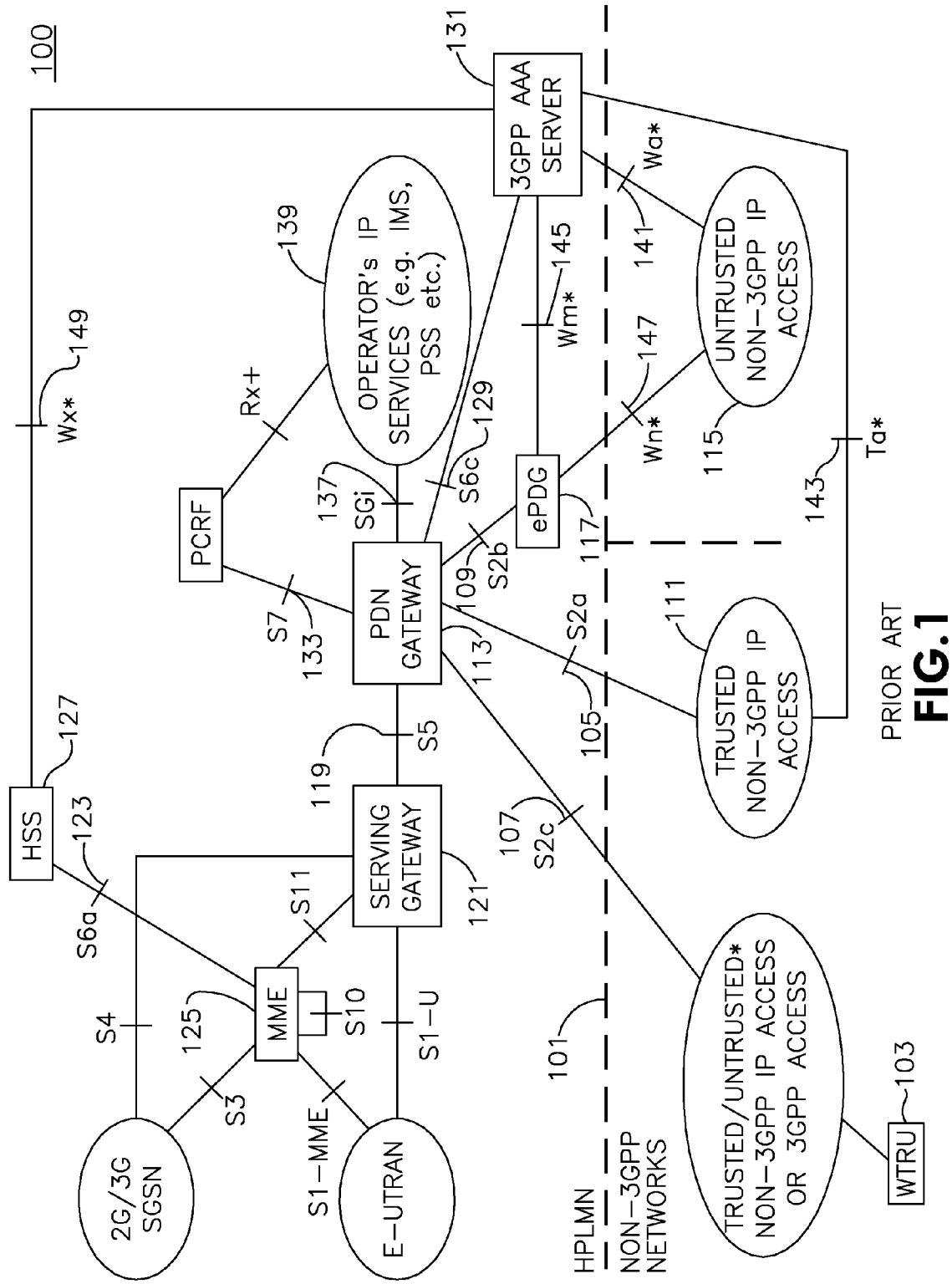
FIG. 1 shows a conventional network architecture.
Figure 2:
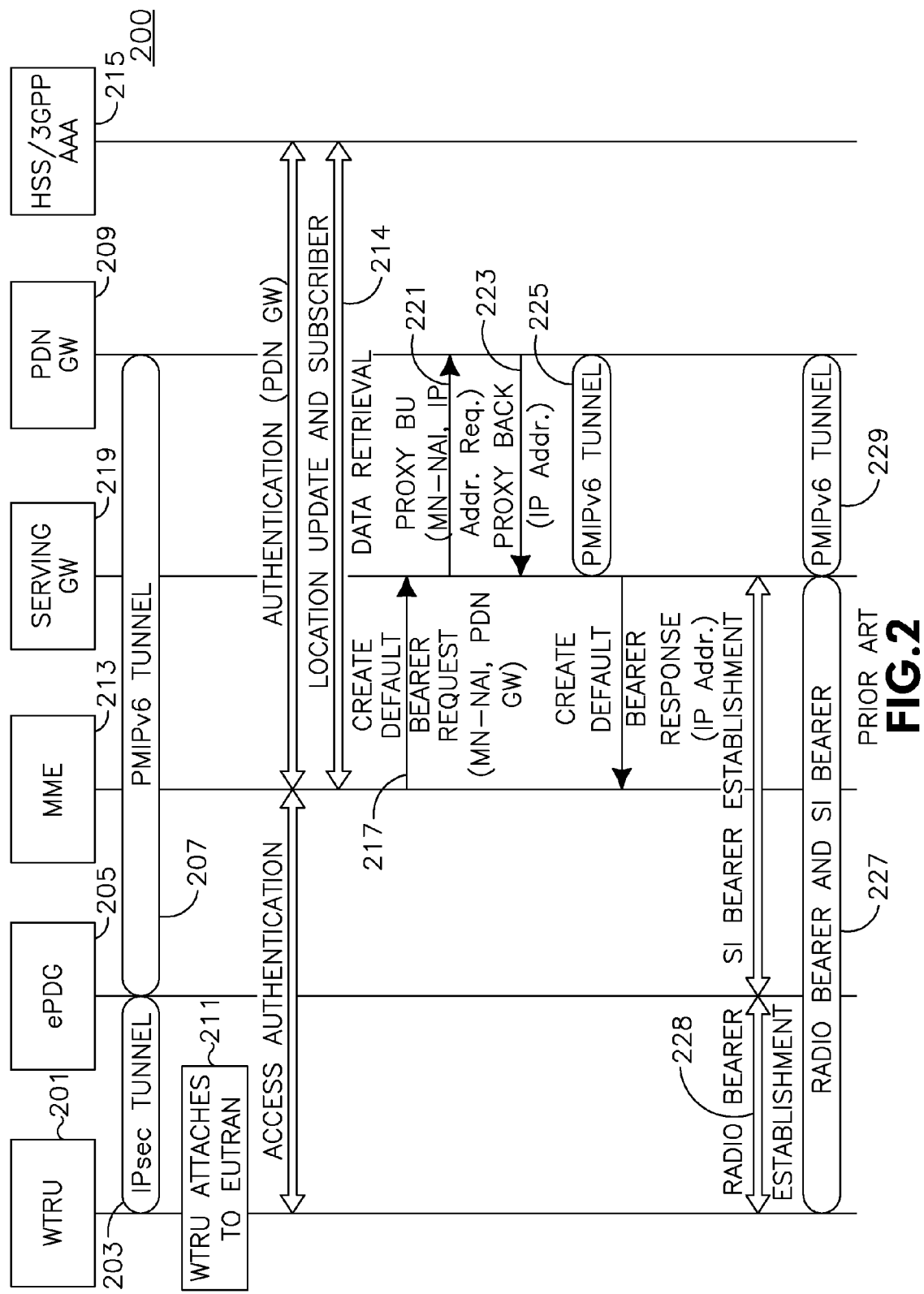
FIG. 2 is a diagram showing an untrusted non-3GPP IP access with PMIPv6 to E-UTRAN handover in a conventional non-roaming scenario over S2b.
Figures 6A, 6B:
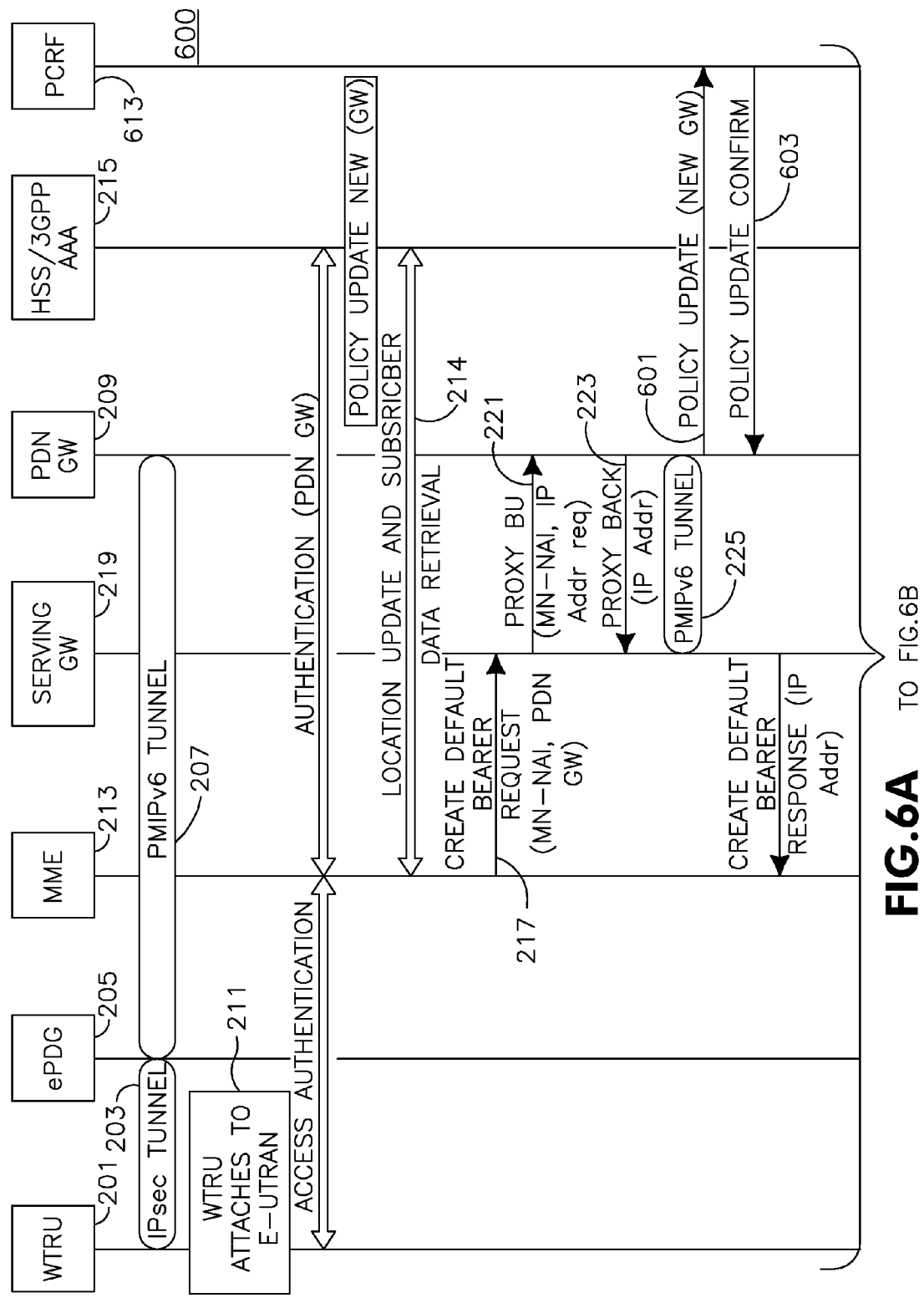
FIGS. 6A and 6B show proposed enhancements to an untrusted non-3GPP IP access to E-UTRAN handover using S2b in a non-roaming case.
Figure 6B:
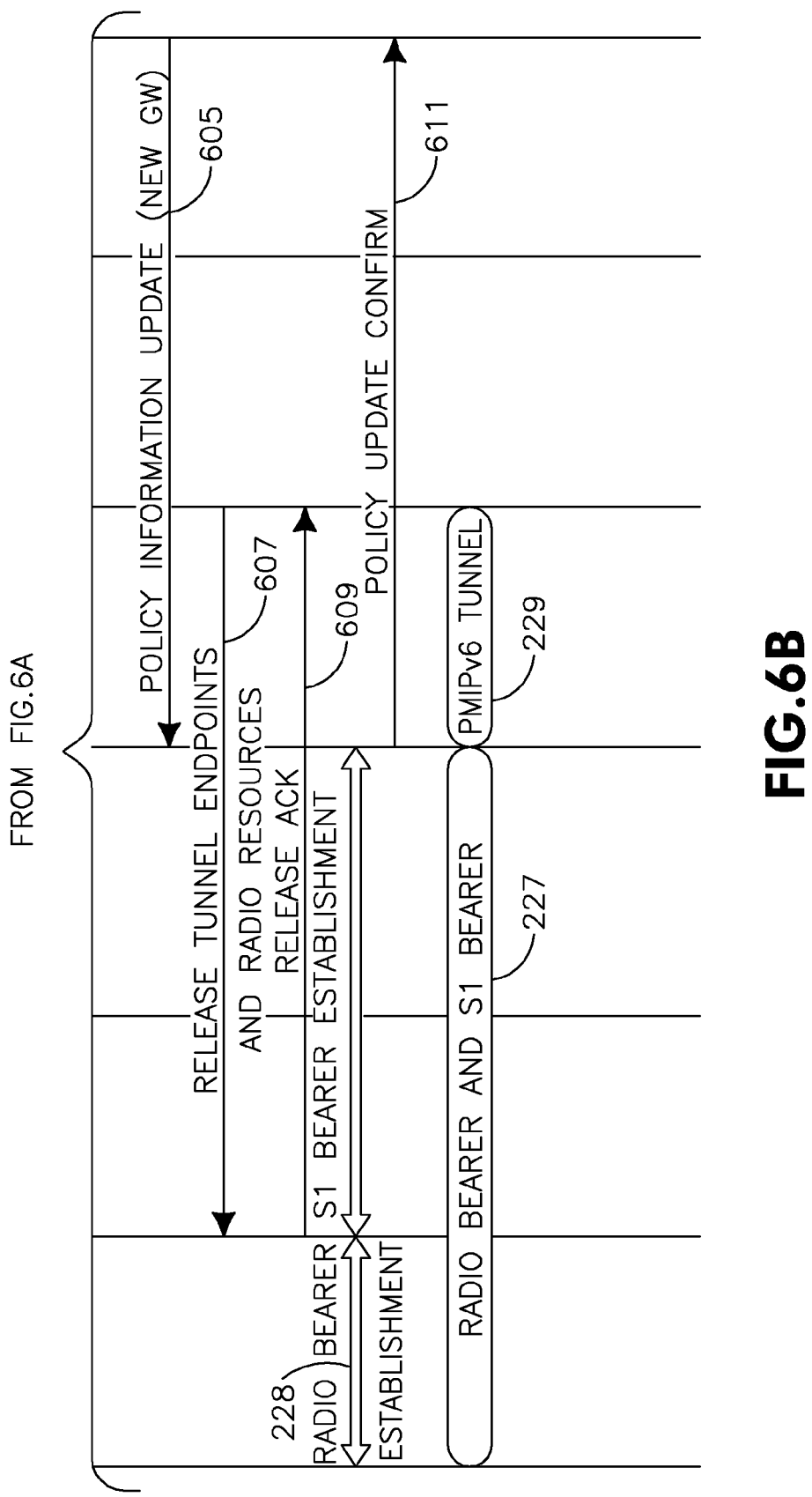

A diagram illustrating an enhanced handover process 600 between untrusted non-3GPP IP access using PMIPv6 to an E-UTRAN 3GPP network over the S2b interface is depicted in FIGS. 6A and 6B. The enhancements are added with respect to the handover as described in FIG. 2. The WTRU 201 is initially connected to the untrusted non-3GPP access. There is an IPsec tunnel 203 between the WTRU 201 and the ePDG 205 and a PMIPv6 tunnel 207 between the ePDG and the PDN GW 209. As the WTRU 201 moves, it may be moved from the untrusted non-3GPP IP access to a 3GPP architecture such as E-UTRAN. The WTRU 201 attaches to the E-UTRAN network 211. Next, the WTRU 201 performs access authorization with the MME 213. The MME 213 contacts the HSS 215 for authentication of the WTRU 201. As part of the authentication procedure, the PDN GW 209 that will be used is conveyed to the MME 213. The MME 213 performs a location update procedure and subscriber data retrieval 214 from the HSS 215. After the MME 213 authenticates the WTRU 201, it sends a create default bearer request message 217 to the serving GW 219. In the message 217, the MME 213 includes the WTRU's 201 NAI and the PDN GW 209 that will be used. The serving GW 219 sends a proxy BU message 221 to the PDN GW 209 to setup a default bearer for the WTRU 201. The proxy BU 221 includes the WTRU's 201 identifier and a request for an IP address from the PDN GW 209. The PDN GW 209 processes the proxy BU message 221 from the serving GW 219, updates the binding cache entry for the WTRU 201 and responds with a proxy binding acknowledgement 223. In the proxy binding acknowledgement 223, the PDN GW 209 replies with the same IP address or prefix that was assigned to the WTRU 201 earlier. At that point a PMIPv6 tunnel 225 exists between the PDN GW 209 and the serving GW 219.

A policy update message 601 is sent from the PDN GW 209 to a PCRF 613. The PCRF 613 sends a policy update confirmation message 603 to the PDN GW 209. The serving GW 219 responds to the MME 213 with the create default bearer response message 217. In this message 217, the serving GW 219 includes the IP address of the WTRU 201. The PCRF 613 sends a policy information update message 605 to the serving GW 219. The PDN GW 209 sends a message to the ePDG 205 to release tunnel endpoints and radio resources 607. The ePDG 205 responds with a release acknowledgement message 609. An S1_U default bearer establishment procedure 227 is performed including a radio bearer setup 228. The serving GW 219 sends a policy update confirmation message 611 to the PCRF 613. At the end of the handover procedure 200, there is a default bearer for the WTRU 201 that consists of E-UTRAN radio bearer 227, S1 bearer between the eNode B and the serving GW 219 and a PMIPv6 tunnel 229 between the serving GW 219 and the PDN GW 209.

Figure 3A:
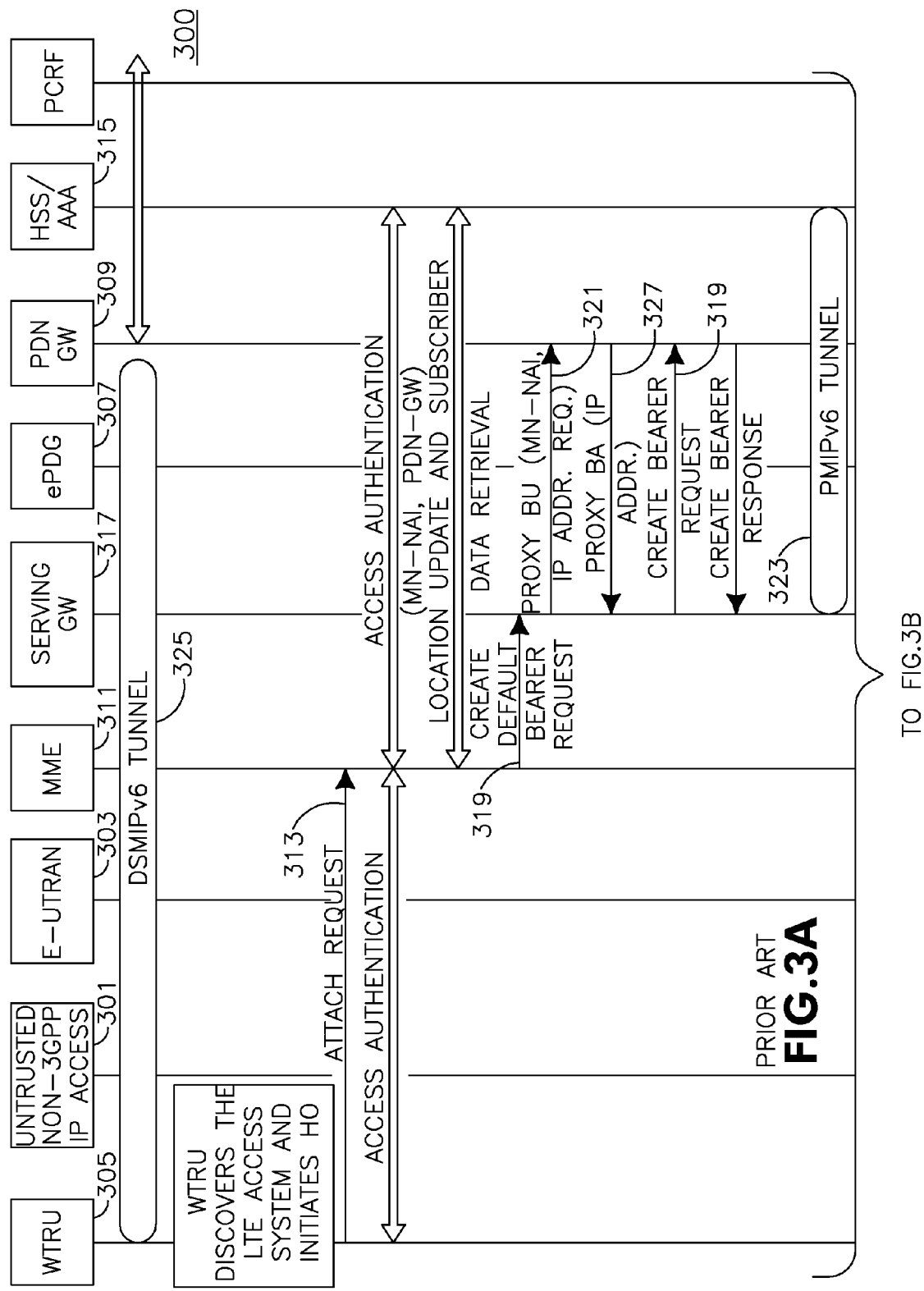
FIGS. 3A and 3B show an untrusted non-3GPP IP access with PMIPv6 to E-UTRAN handover in a conventional non-roaming scenario over S2c.
Figure 3B:
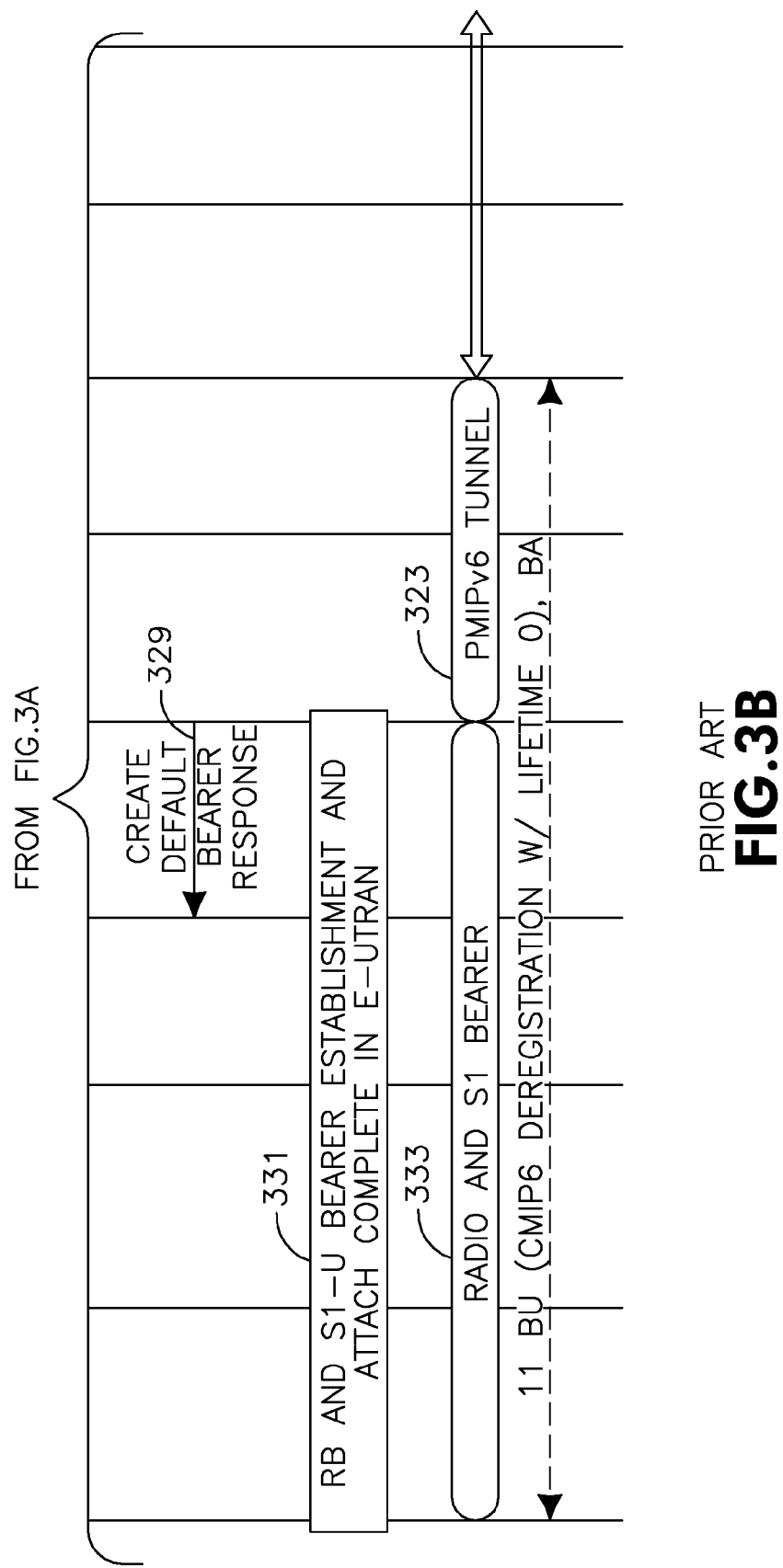
Figures 7A, 7B:
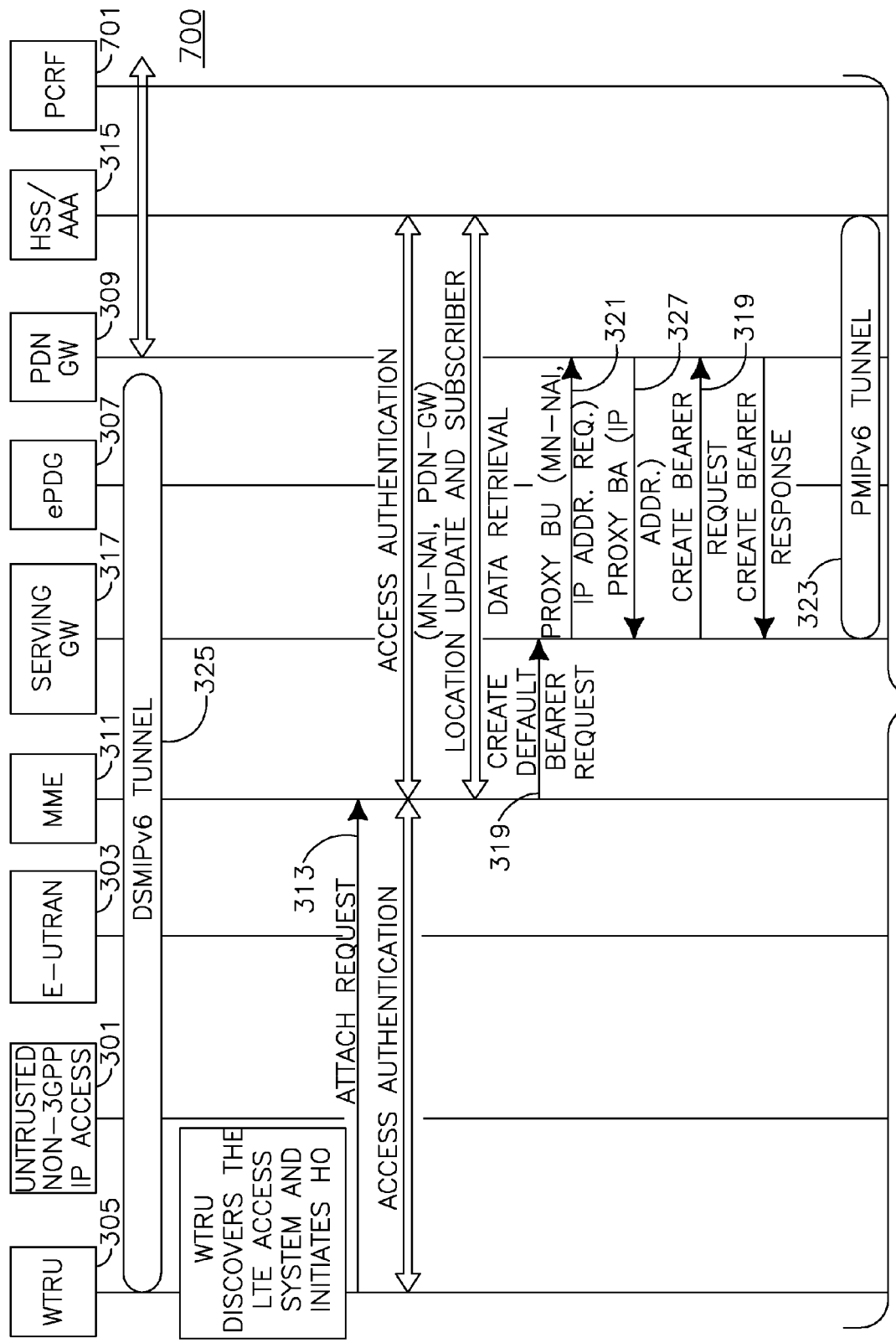
FIGS. 7A and 7B show proposed enhancements to an untrusted non-3GPP IP access to E-UTRAN with PMIPv6 handover in a non-roaming scenario using S2c.
Figure 7B:
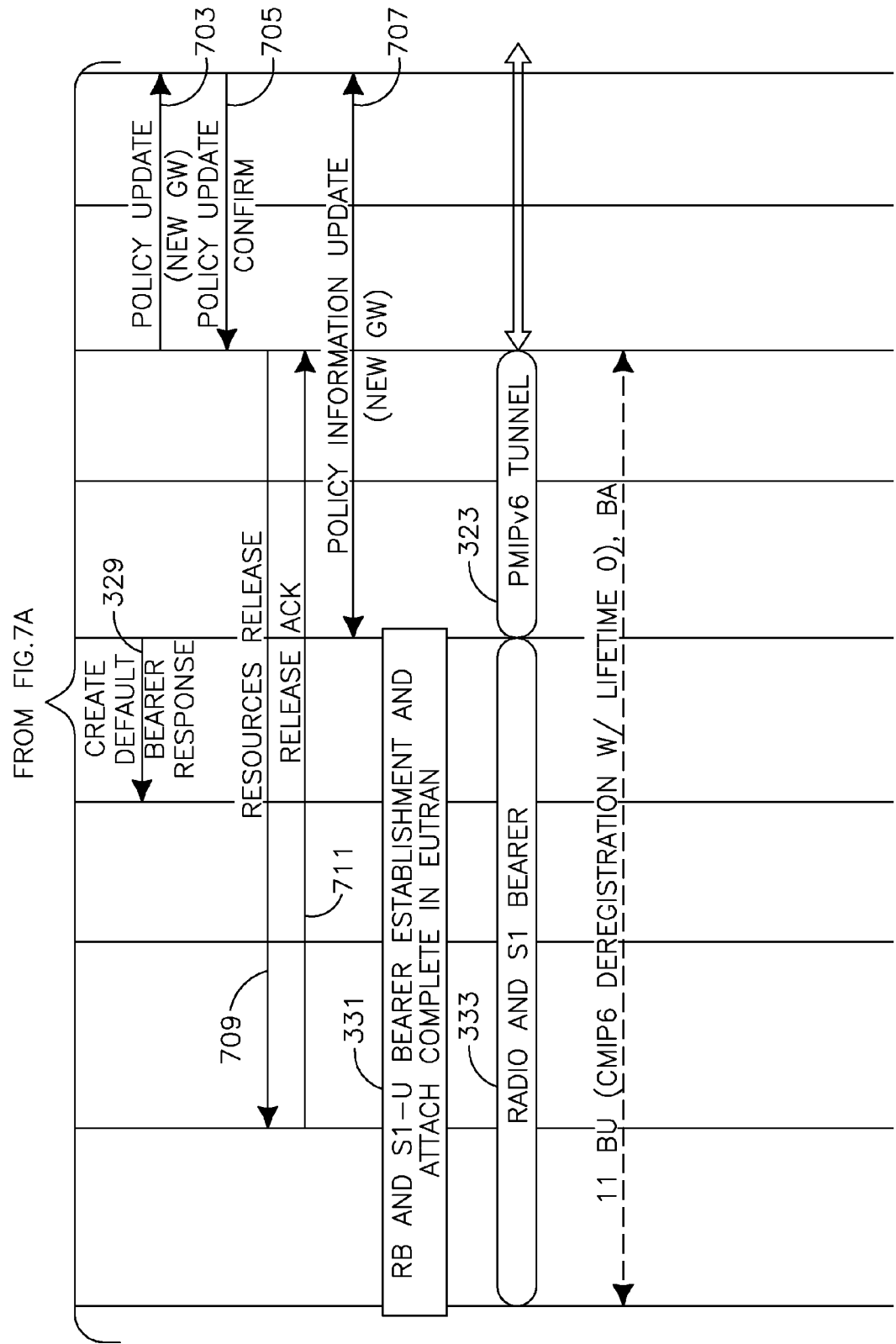

FIGS. 7A and 7B show an enhanced handover process between untrusted non-3GPP IP access using PMIPv6 to an E-UTRAN 3GPP network over the S2c interface. Enhancements are added to the handover operation described in FIG. 3. The session starts in untrusted non-3GPP access 301 using DSMIPv6 over the S2c interface. The session hands over to 3GPP access, for example, E-UTRAN 303. The WTRU 305 uses an untrusted non-3GPP access system 301. It has an IPsec/IKEv2 session with the ePDG 307 and a DSMIPv6 session with the PDN GW 309. The WTRU 305 discovers the 3GPP access system 303 and determines to handover from the currently used trusted non-3GPP 301 access system to the discovered 3GPP access system 303. The WTRU 305 sends an attach request 313 which is routed by 3GPP access system 303 to an MME 311 instance in the evolved packet core (EPC) which is not shown. The MME 311 contacts the HSS/3GPP AAA 315 and authenticates the WTRU 305. As part of the authentication procedure, the IP address of the PDN GW 309 that needs to be used for 3GPP access is conveyed to the MME 311. After successful authentication, the MME 311 performs a location update procedure with HSS 315. The MME 311 selects a serving GW 317 and sends a create default bearer request message 319 to the selected PDN GW 309. The serving GW 317 may initiate the PMIPv6 registration procedure towards the PDN GW 309 by sending a Proxy Binding Update 321, such as when using Internet Engineering Task Force (IETF) based S5 interface between the PDN GW 309 and the serving GW 317. If GPRS Tunneling Protocol (GTP) is used for S5, the serving GW 317 sends a create bearer request message 319 to the PDN GW 309. In IETF based S5, the PDN GW 309 responds with a proxy binding acknowledgement 227 and updates its mobility binding which effectively switches the DSMIPv6 tunnel from the non-3GPP access network to the PMIPv6 tunnel to the serving GW 317. In the proxy binding acknowledgement 327, the PDN GW 309 includes the home IP address or prefix that was assigned to the WTRU 305 earlier. For GTP-based S5, the PDN GW 309 responds with a create bearer response message 329 to the serving GW 317. The create bearer response 329 contains the home IP address or prefix that was assigned to the WTRU 305 earlier. At this point, a PMIPv6/GTP tunnel exists between the serving GW 317 and the PDN GW 309.

The PDN GW 309 sends a policy update message 703 to the PCRF 701. The PCRF responds with a policy update confirmation message 705. The serving GW 317 then returns a create default bearer response message 329 to the MME 311 that includes the IP address of the WTRU 305 and receives a policy information update 707 from the PCRF 701. This message 329 also serves as an indication to the MME 311 that the binding was successful. The ePDG 307 sends a message to the non-3GPP IP access 301 to release resources 709. A release acknowledgement message 711 is returned to the ePDG 307. The MME 311 sends an attach accept message 331 to the WTRU 305 through 3GPP access 303. The 3GPP access system 303 initiates radio bearer setup procedures and the 3GPP access system responds with an Attach Complete Message 331. The WTRU 305 may send a binding update 321 to the PDN GW 309 to de-register its DSMIPv6 binding 325 that was created while the WTRU 305 was in untrusted non-3GPP IP access 301. The WTRU 305 may send IKEv2 messages if necessary to tear down its system aspects (SA) with the ePDG 307.

Figure 4:
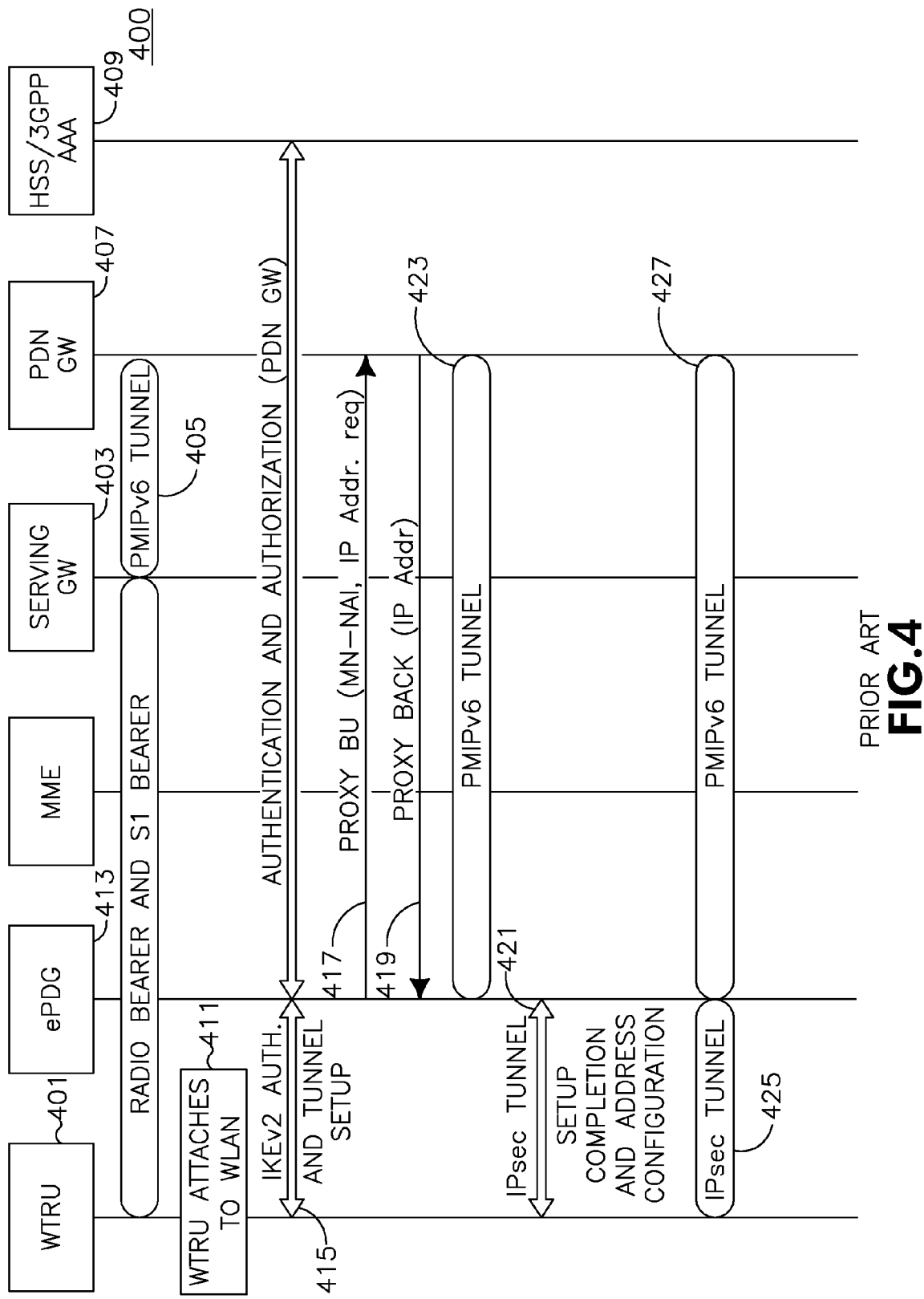
FIG. 4 shows an E-UTRAN to untrusted non-3GPP IP access with PMIPv6 handover in a conventional non-roaming scenario over 2Sb.
Figure 5:
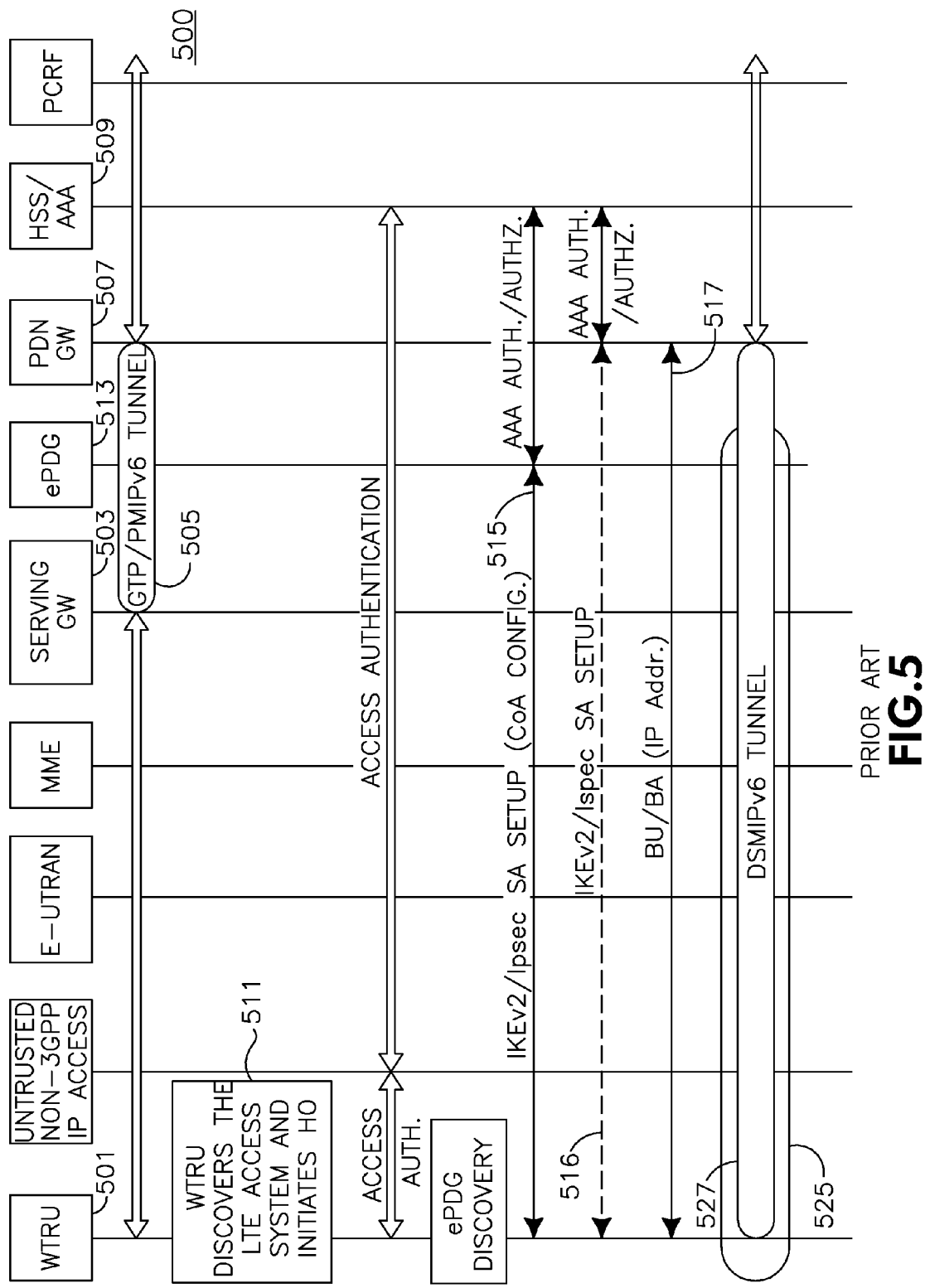
FIG. 5 shows proposed enhancements to an E-UTRAN to untrusted non-3GPP IP access handover using S2c in a non-roaming case.
Figures 8A, 8B:
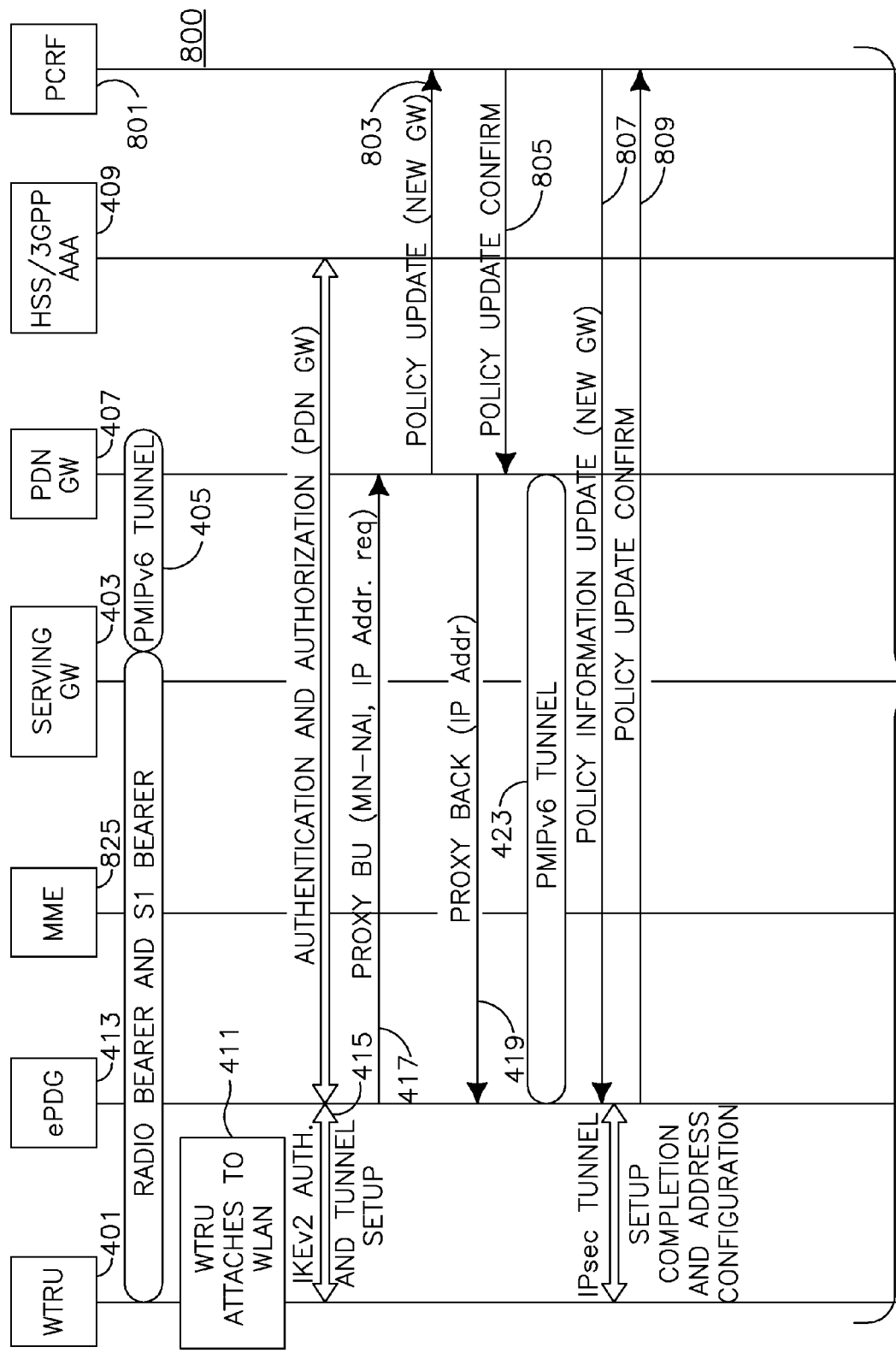
FIGS. 8A and 8B show proposed enhancements from an E-UTRAN network to an untrusted non-3GPP IP access handover using S2b in a non-roaming case.
Figure 8B:
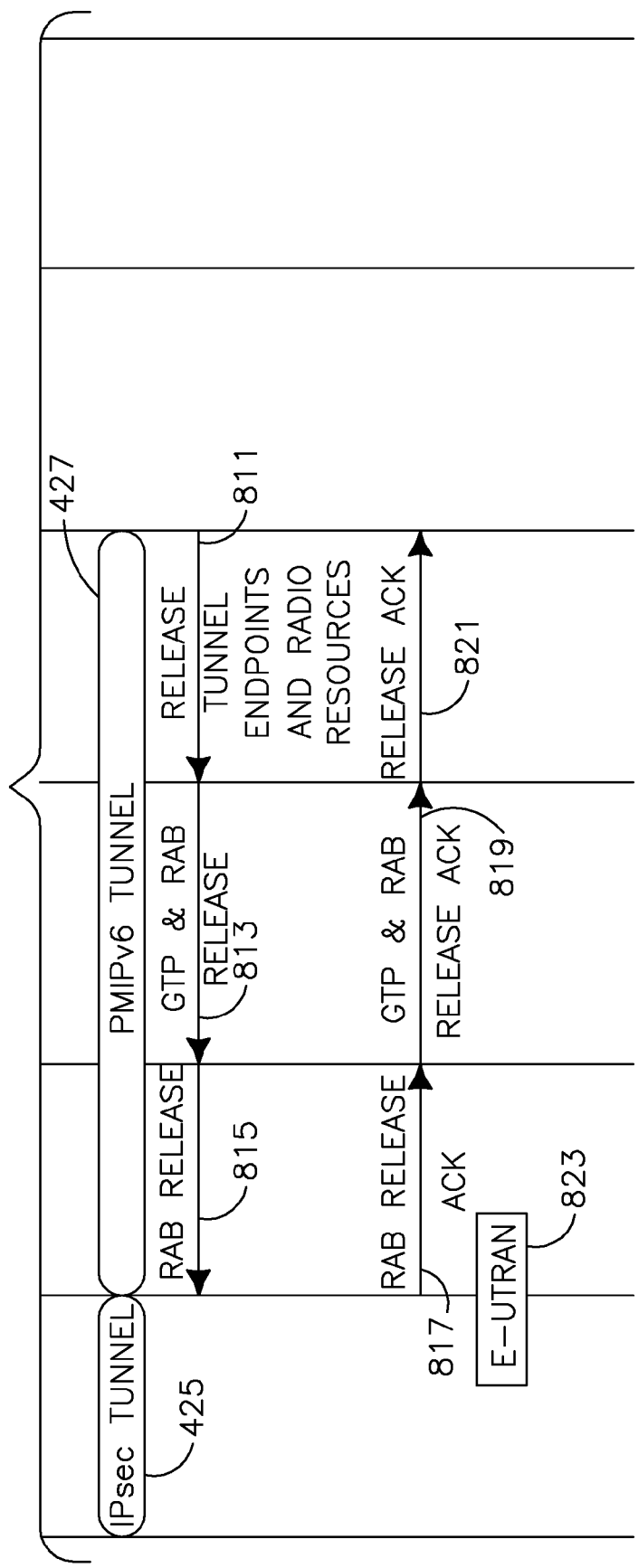

An enhanced handover procedure from a 3GPP network to an untrusted non-3GPP network through the S2b interface shown in FIG. 4 is shown in FIGS. 8A and 8B. The WTRU 401 is connected to the 3GPP network through the serving GW 403 via a PMIPv6 Tunnel 405 to the PDN GW 407 when handover is initiated. The WTRU attaches to the non-3GPP network 411. Authentication of the WTRU 401 is performed by the HSS/AAA 409 on the 3GPP system. IKEv2 authorization and tunnel setup 415 between the WTRU 401 and the ePDG 413 is then established. A proxy binding update message 417 is sent to the PDN GW 407. The proxy binding acknowledgement message 419 is returned to the ePDG 413. The PDN GW 407 sends a policy update message 803 to the PCRF 801. The PCRF 801 responds with policy update confirmation message 805. The policy information update message 807 is sent from the PCRF 801 to the ePDG 413, and the ePDG 413 returns a policy update acknowledgement message 809. The IPsec tunnel setup and address configuration is performed 421 and the PMIPv6 tunnel 423 is established between the ePDG 413 and the PDN GW 407. The MME 825 sends a message to release the radio access bearer (RAB) 815 to the 3GPP access network 823. The 3GPP network 823 then acknowledges the RAB release 817. The MME 825 releases RAB and GTP resources 813 serving GW 403. The serving GW responds with confirmation message 819. Tunnel endpoints and radio resources between the PDN GW 407 and the serving GW 403 are released 811. Non-3GPP IP access is now established through an IPsec Tunnel 425 between the WTRU 401 and the ePDG 413 and a PMIPv6 tunnel 427 between the ePDG 413 and the PDN GW 407.

Figure 9A:
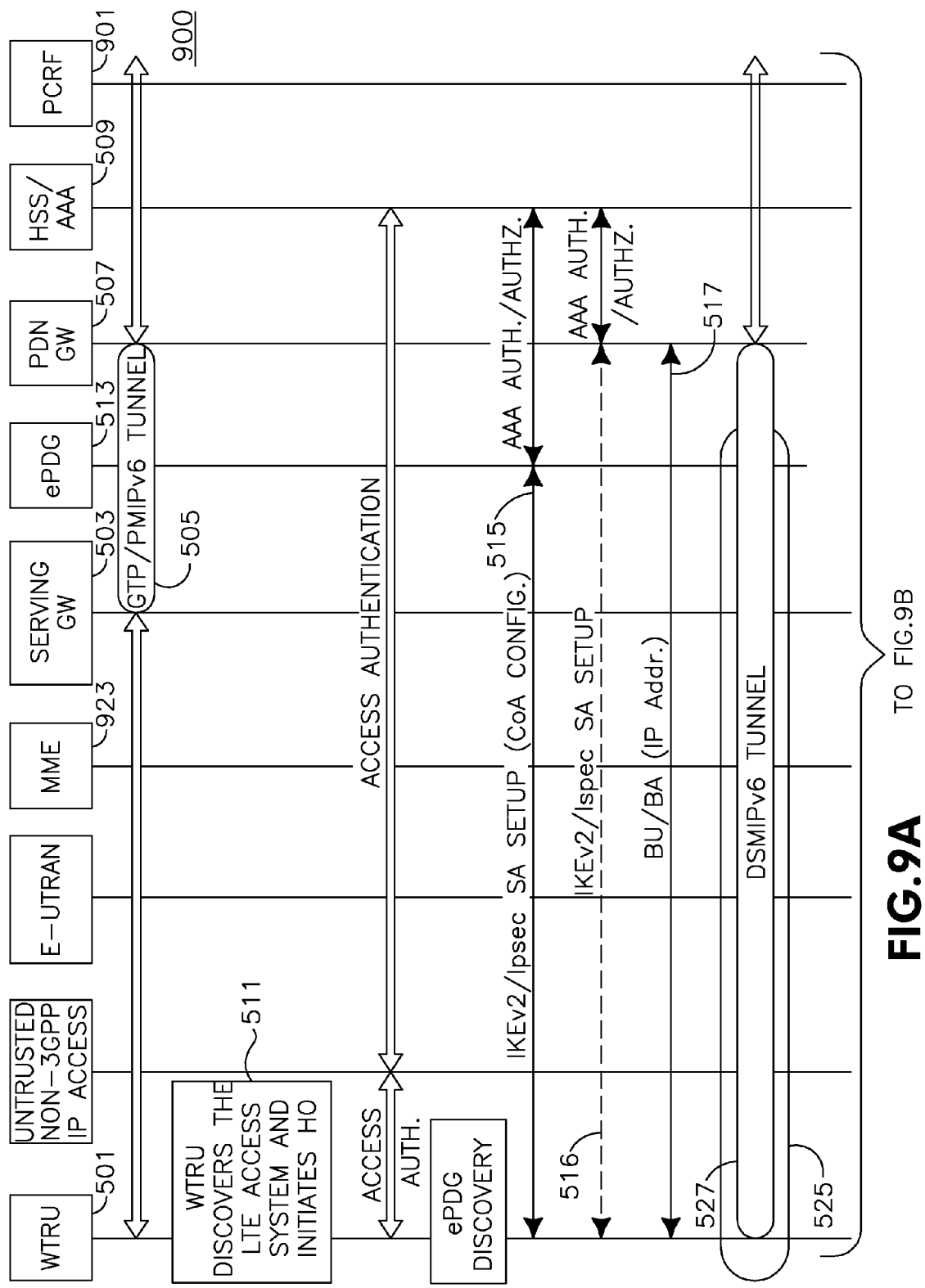
FIGS. 9A and 9B shows proposed enhancements to an E-UTRAN to untrusted non-3GPP IP access with PMIPv6 handover in a non-roaming scenario using S2c.
Figure 9B:
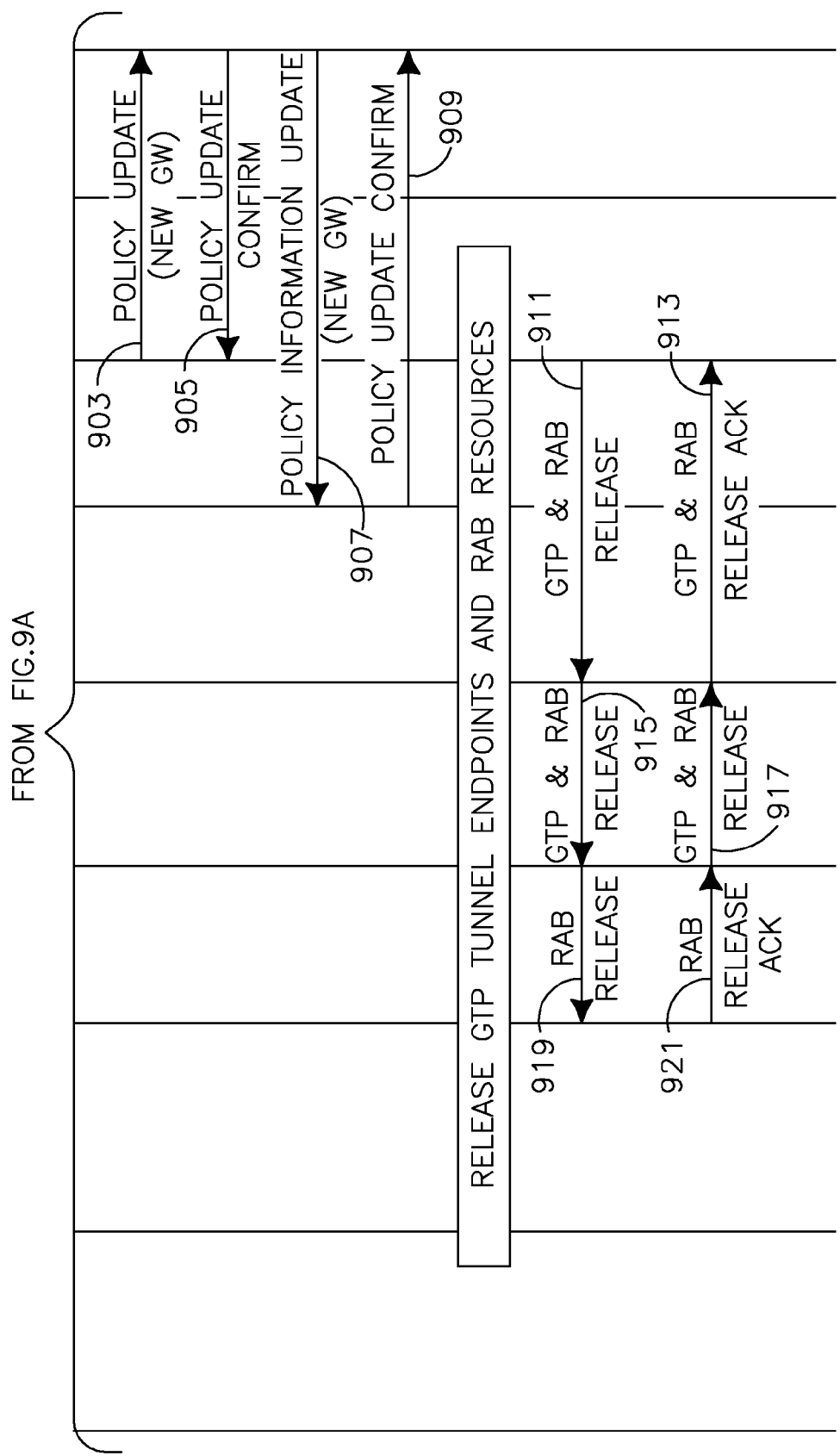

The enhanced handover process 900 from 3GPP IP Access to trusted/untrusted non-3GPP IP access over the S2c interface is shown in FIGS. 9A and 9B. The WTRU 501 is connected to the 3GPP network through the serving GW 503 through a PMIPv6 Tunnel 505 to the PDN GW 507 when handover is initiated. The WTRU attaches to the non-3GPP network 511. Authentication of the WTRU 501 is done by the HSS/AAA 509 on the 3GPP system. IKEv2 authorization and tunnel setup 515 between the WTRU 501 and the ePDG 513 when the non-3GPP network is untrusted. Alternatively the IKEv2 authorization and tunnel setup 516 may occur between the WTRU 501 and the PDN GW 507 when the non-3GPP network is a trusted network. A proxy binding update message 517 is sent the PDN GW 507. The proxy binding acknowledgement message 517 is returned to the ePDG 513. The IPsec tunnel setup and address configuration is performed 521 and the PMIPv6 tunnel 527 is established between the WTRU 401 and the PDN GW 407. Non-3GPP IP access is now established through an IPsec Tunnel 525 between the WTRU 501 and the ePDG 513 and a PMIPv6 tunnel 527 between the WTRU 501 and the PDN GW 507. The PDN GW 507 then sends a policy update message 903 to the PCRF 901. The PCRF 901 returns a policy update confirmation message 905 to the PDN GW 507. The PCRF 901 sends a policy information update message 907 to the ePDG 513 which responds with a confirmation message 909. The PDN GW 507 then sends the serving GW 503 a message 911 to release the GTP and RAB resources. The serving GW 503 responds with a GTP and RAB release acknowledgement message 913. The serving GW then sends a GTP and RAB release message 915 to the MME 923 that sends an acknowledgment 917 to the serving GW 503. The MME 923 then sends the E-UTRAN network a RAB release 919 which is acknowledged by an acknowledgement message 921. The GTP tunnel and RAB resources are now released and the WTRU 501 is connected through IPsec tunnel 525 and DSMIPv6 tunnel 527.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A packet data network gateway (PDN GW) configured to perform a policy update during a handover operation of a wireless transmit/receive unit (WTRU) from a third generation partnership project (3GPP) access network to a non-3GPP access network, the PDN GW comprising:
   a transceiver configured to receive a proxy binding update message from an evolved packet data gateway (ePDG) indicating a handover;
   the transceiver further configured to send a policy update message to a policy and charging rules function (PCRF) in response to receiving the proxy binding update message;
   the transceiver further configured to receive a policy update confirmation message from the PCRF and send a proxy binding acknowledgement message to the ePDG, wherein the proxy binding acknowledgment message is configured to establish a proxy mobile internet protocol version 6 (PMIPv6) tunnel with the ePDG on an S2*b* interface; and
   the transceiver further configured to send a message to a serving gateway (GW) requesting a release of resources utilized by the PDN GW within the 3GPP access network upon receiving the policy update confirmation message.

2. The PDN GW of claim 1, wherein the 3GPP access network is an evolved universal terrestrial radio access network (E-UTRAN).

3. The PDN GW of claim 1, wherein the non-3GPP network is a trusted network.

4. The PDN GW of claim 1, wherein the non-3GPP network is an untrusted network.

5. The PDN GW of claim 4, wherein the proxy binding update message includes a request for an IP address for the WTRU.

6. The PDN GW of claim 5, wherein the proxy binding acknowledgement message includes the IP address for the WTRU.

7. The PDN GW of claim 1, further comprising a processor configured to update a binding cache entry for the WTRU based on receiving the proxy binding update message.

8. The PDN GW of claim 1, wherein the transceiver is further configured to receive a resource release acknowledgement message from the serving GW.

9. A method for handover of a wireless transmit/receive unit (WTRU) from a third generation partnership project (3GPP) access network to a non-3GPP access network, the method comprising:
   receiving a proxy binding update message from an evolved packet data gateway (ePDG) indicating a handover;
   sending, from a packet data network gateway (PDN GW), a policy update message to a policy and charging rules function (PCRF) in response to receiving the proxy binding update message;
   receiving, at the PDN GW, a policy update confirmation message from the PCRF;
   sending a proxy binding acknowledgement message to the ePDG, wherein the proxy binding acknowledgment message establishes a proxy mobile internet protocol version 6 (PMIPv6) tunnel with the ePDG on an S2*b* interface; and
   sending a message to a serving gateway (GW) requesting a release of resources utilized by the PDN GW within the 3GPP access network upon receiving the policy update confirmation message.

10. The method of claim 9, wherein the 3GPP access network is an evolved universal terrestrial radio access network (E-UTRAN).

11. The method of claim 9, wherein the non-3GPP network is a trusted network.

12. The method of claim 9, wherein the non-3GPP network is an untrusted network.

13. The method of claim 12, wherein the proxy binding update message includes a request for an IP address of the WTRU.

14. The method of claim 13, wherein the proxy binding acknowledgement message includes the IP address for the WTRU.

15. The method of claim 9, further comprising updating a binding cache entry for the WTRU based on receiving the proxy binding update message.

16. The method of claim 9, further comprising receiving a resource release acknowledgement message from the serving GW.

* * * * *